United States Patent [19]

Stavlo

[11] Patent Number: 4,542,774
[45] Date of Patent: Sep. 24, 1985

[54] DELIVERY SYSTEM AND METHOD FOR PRESSURIZED GAS

[75] Inventor: Lars G. Stavlo, Sigtuna, Sweden

[73] Assignee: AGA AB, Cleveland, Ohio

[21] Appl. No.: 416,238

[22] Filed: Sep. 9, 1982

[51] Int. Cl.⁴ .............................................. B65B 3/04
[52] U.S. Cl. .......................................... 141/1; 141/98; 141/231; 141/237; 141/284; 206/597
[58] Field of Search ....................... 141/1–12, 141/237–248, 250–284, 98, 231, 232, 233; 206/597, 430, 391, 392, 393, 394; 410/35, 36, 42, 47–49

[56] References Cited

U.S. PATENT DOCUMENTS

| | | | |
|---|---|---|---|
| Re. 22,507 | 6/1944 | Heigis | 211/75 |
| 1,854,711 | 4/1932 | Mayer | 280/1 |
| 2,317,064 | 4/1943 | Josephian | 280/1 |
| 2,404,513 | 7/1946 | McCabe | 211/71 |
| 2,518,569 | 8/1950 | Pierson | 48/192 |
| 2,574,017 | 11/1951 | Copping | 296/3 |
| 2,662,649 | 12/1953 | Gill et al. | 214/101 S |
| 2,989,176 | 6/1961 | Hasselhoff | 206/65 |
| 3,253,707 | 5/1966 | Gooding | 206/65 |
| 3,259,249 | 7/1966 | Arts | 211/75 |
| 3,451,573 | 6/1969 | Josephian | 410/36 |
| 3,602,368 | 8/1971 | Gould | 211/75 |
| 3,724,394 | 4/1973 | Pringle | 410/5 |
| 3,837,614 | 9/1974 | Pacovits et al. | 141/244 |
| 3,993,344 | 11/1976 | Bennett | 296/35 |
| 4,061,391 | 12/1977 | Violette | 296/4 |
| 4,173,334 | 11/1979 | Lombard | 294/67 E |
| 4,295,431 | 10/1981 | Stavlo | 108/55.1 |

OTHER PUBLICATIONS

ICG Symposium entitled, "Safe Cylinder Handling".

*Primary Examiner*—Houston S. Bell, Jr.
*Attorney, Agent, or Firm*—David A. Burge

[57] ABSTRACT

A delivery system for pressurized gas utilizes a flat bed vehicle provided with a fore-and-aft-extending central divider which defines rows of pallet sites on each side thereof. Pallets carried at the sites each protectively enclose a plurality of pressurized gas cylinders and have an overhead gas delivery manifold which is connected to the cylinders. The pallets are retained on the bed of the vehicle by pallet-engaging projections carried on the central divider, and by blocking means arranged along the margins of the vehicle. A piping system extends along the central divider and is connected to a control panel. Bridging conduits connect the piping system with each of the pallet manifolds. Each of the bridging conduits is constructed such that, when its connection with a pallet manifold is released, the bridging conduit automatically retracts to an out-of-the-way position, thereby clearing the path for pallet loading or unloading.

25 Claims, 7 Drawing Figures

DELIVERY SYSTEM AND METHOD FOR PRESSURIZED GAS

CROSS-REFERENCE TO RELATED APPLICATIONS AND PATENT

IMPROVED PALLET FOR PRESSURIZED GAS CYLINDERS, Ser. No. 416,118 filed Sept. 9, 1982 by Lars G. Stavlo, hereinafter referred to as the "Pallet Case," the disclosure of which is incorporated herein by reference.

METHOD AND APPARATUS FOR TRANSPORTING PRESSURIZED GAS CYLINDERS, Ser. No. 416,237 filed Sept. 9, 1982 by Lars G. Stavlo, hereinafter referred to as the "Banding Case," the disclosure of which is incorporated herein by reference.

PALLET FOR PRESSURIZED GAS CYLINDERS, U.S. Pat. No. 4,295,431 issued Oct. 10, 1981 to Lars G. Stavlo, hereinafter referred to as the "Pallet Patent," the disclosure of which is incorporated herein by reference.

BACKGROUND OF THE INVENTION

1. Field of the Invention

The present invention relates to the delivery of large quantities of pressurized gas stored in cylinders and, more particularly, to a pressurized gas handling system employing a vehicle carrying large numbers of such cylinders from a base station to a customer use location.

2. Prior Art

The referenced Pallet Patent discloses a pallet for receiving, retaining and facilitating the transportation of pressurized gas cylinders. Such pallets are utilized for loading and off-loading cylinders from transport vehicles, and for the transportation of one or more pressurized gas cylinders from place to place.

While prior proposals have utilized pallets of the type described in the Pallet Patent to handle and transport pressurized gas cylinders, prior proposals have not adequately addressed the need to handle large numbers of pressurized gas cylinders in a highly efficient fashion to effect rapid loading of a transport vehicle with pallets, manifolding the cylinders together to provide one or a plurality of large volume sources of pressurized gas, and off-loading the pallets for cylinder recharging when required. The prior art has not adequately addressed the need for means to speedily secure such pallets to a vehicle and release them therefrom. Nor has the prior art adequately addressed the need for a means to connect pallet-carried cylinders to gas delivery piping carried on a transport vehicle in a manner which provides both speedy hookup and release, as well as providing an arrangement which is so configured as to avoid interference as pallets are moved onto and off of the transport vehicle.

3. The Referenced Applications

Preferably the vehicle of the present invention is used in cooperation with the pallet construction described in the referenced Pallet Case. Preferably the cylinders carried on such pallets are secured in place by the retaining system described in the referenced Banding Case.

SUMMARY OF THE INVENTION

The present invention addresses the foregoing and other drawbacks of the prior art, and provides a pressurized gas delivery system for efficient loading of cylinder pallets onto transport vehicles, for off-loading them therefrom, and for efficiently supplying customers with large volumes of pressurized gas products.

The handling of pressurized gases is complicated by many factors including the very substantial weight of the cylinders which must be used to store gas under pressure, and in some cases by the chemical nature of the gas itself. While the system of the present invention will be discussed in terms of the handling of acetylene for which it is primarily used, as will be readily recognized, many aspects of the invention are applicable to the handling of other pressurized gases as well.

One of the central pieces of apparatus in such a system is a transport vehicle which may be an automotive truck, or, as is the case in the example described later herein, a semi-trailer to be towed by a tractor. The system of the present invention is designated to effect the transport of a large number of conventional pressurized gas cylinders to move large amounts of a gas such as acetylene from a central gas-filling facility to a customer use location. While it is manifestly desirable to have an integrated load so that gas can be dispensed under a central type of control to accommodate the various conditions met at the customer's facilities, certain restrictions are placed on this integration by safety statutes and regulations.

By way of example, in the case of acetylene, it is customarily required that before a vehicle may have its storage capacity refilled at a central station, a certain percentage of the gas cylinders must undergo individual inspection and be individually refilled in order to assure that these representative cylinders contain a sufficient amount of absorbative material to prevent the occurrence of explosive decomposition of the acetylene under normally encountered temperatures. This requirement necessitates that the manner in which the cylinders are integrated or connected or manifolded must be such as to permit efficient, speedy off-loading of all of the containers, whenever required, to meet such regulations.

In accordance with the preferred practice, a transport vehicle is provided which defines an essentially flat bed. A central fore-and-aft extending divider segregates the bed into two side-by-side regions. Transversely-extending divider structures further divide each side region of the vehicle bed into a plurality of bays. Each bay defines a plurality of pallet-receiving sites. Each pallet site is equipped with horizontal toe-like projections carried by the central divider for engaging pallet portions as pallets are loaded onto the bed to guide the pallets into proper position in the bays, and to interlock therewith as pallets are set in place to anchor the pallets against tilting. Convenient, easily manipulable restraints are additionally provided along each side of the vehicle to assure proper retention of the pallets in their loaded positions aboard the vehicle.

Each pallet carries its own manifold, which is connected to each of the cylinders carried on that pallet. The vehicle has a gas distribution system which allows any selected number of the manifolded pallets to be readily connected to a customer facility for delivery of gas thereto, or any selected number thereof to be simultaneously recharged at a base station. This gas distribution system includes a central piping layout with several feeder manifolds running along the central divider. The feeder manifolds are located so as to offer no interference whatever during the loading or off-loading of pallets. Bridging conduits connect the vehicle-carried feeder manifolds and the pallet-carried manifolds. Each of the bridging conduits is constructed such it automatically raises to a retracted, upright position whenever it is disconnected from a pallet manifold, whereby the lifting of pallets into or out their loaded positions can be performed quickly and efficiently without any interference from the bridging conduits.

DESCRIPTION OF THE PREFERRED EMBODIMENT

Figure 1:
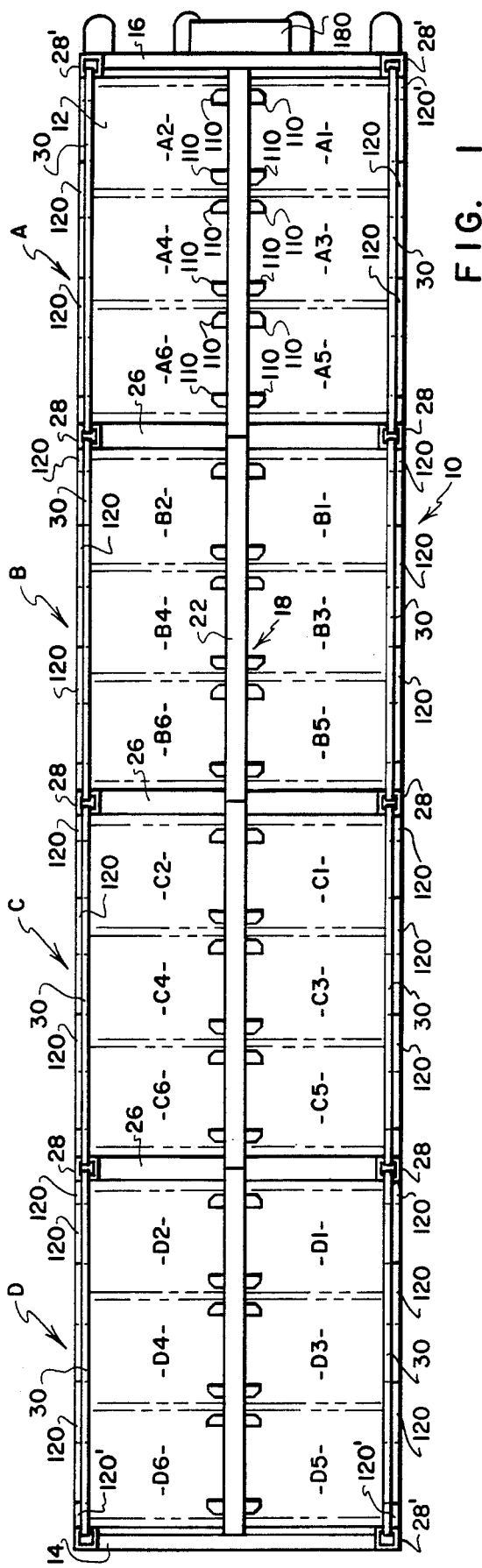
FIG. 1 is a top plan view of a transport vehicle, in this case a trailer, employed in the preferred practice of the present invention, the trailer being designed for carrying palletized gas cylinders, and with pallet-carrying sites on the trailer bed being diagrammatically indicated by phantom lines.
Figure 2:
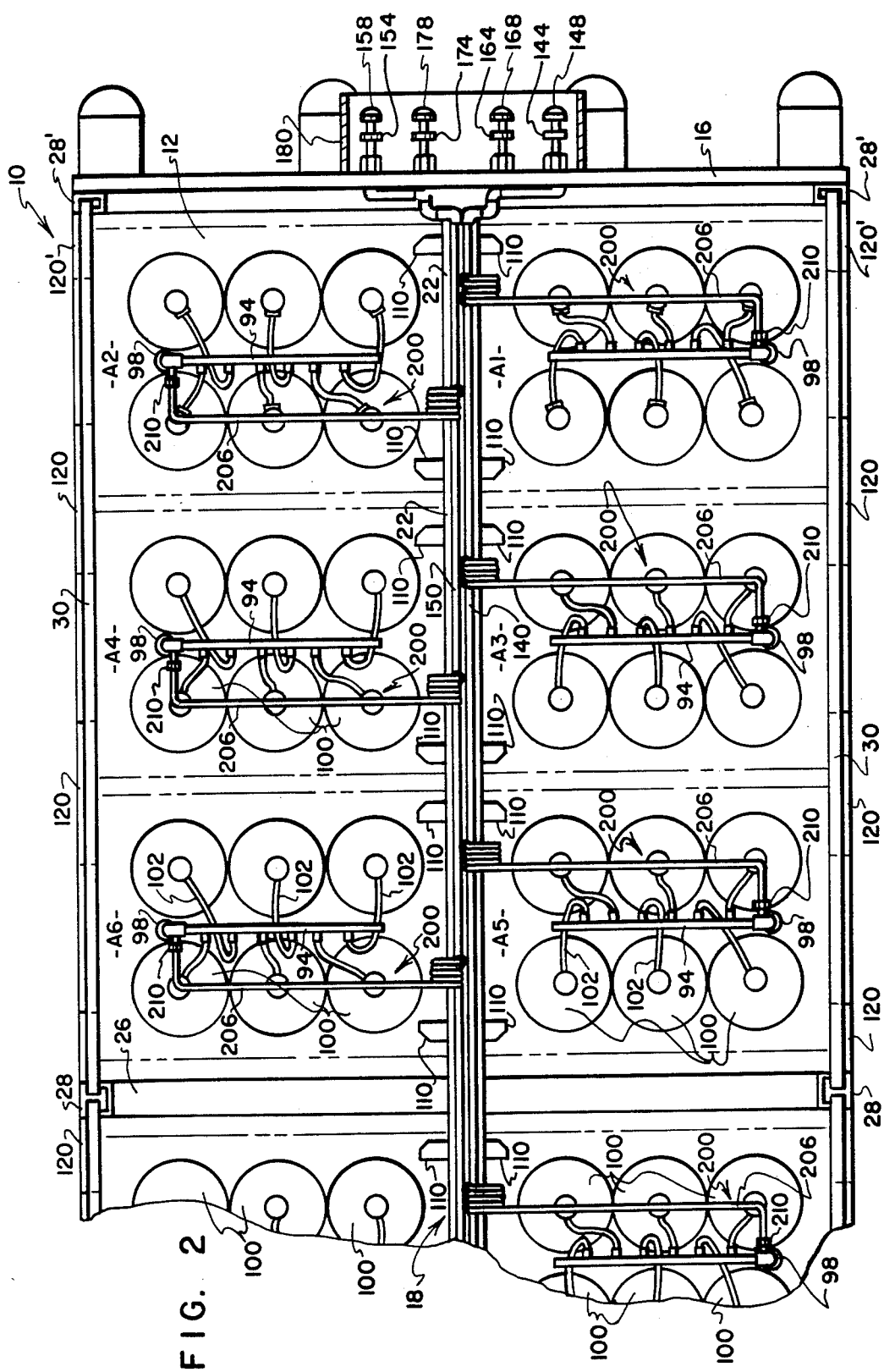
FIG. 2 is a fragmentary top plan view, on an enlarged scale, of a rear portion of the vehicle of FIG. 1, with pallet locations being diagrammatically indicated by phantom lines, and with pallet contents being shown, but with the pallets themselves being omitted to avoid confusion.
Figure 3:
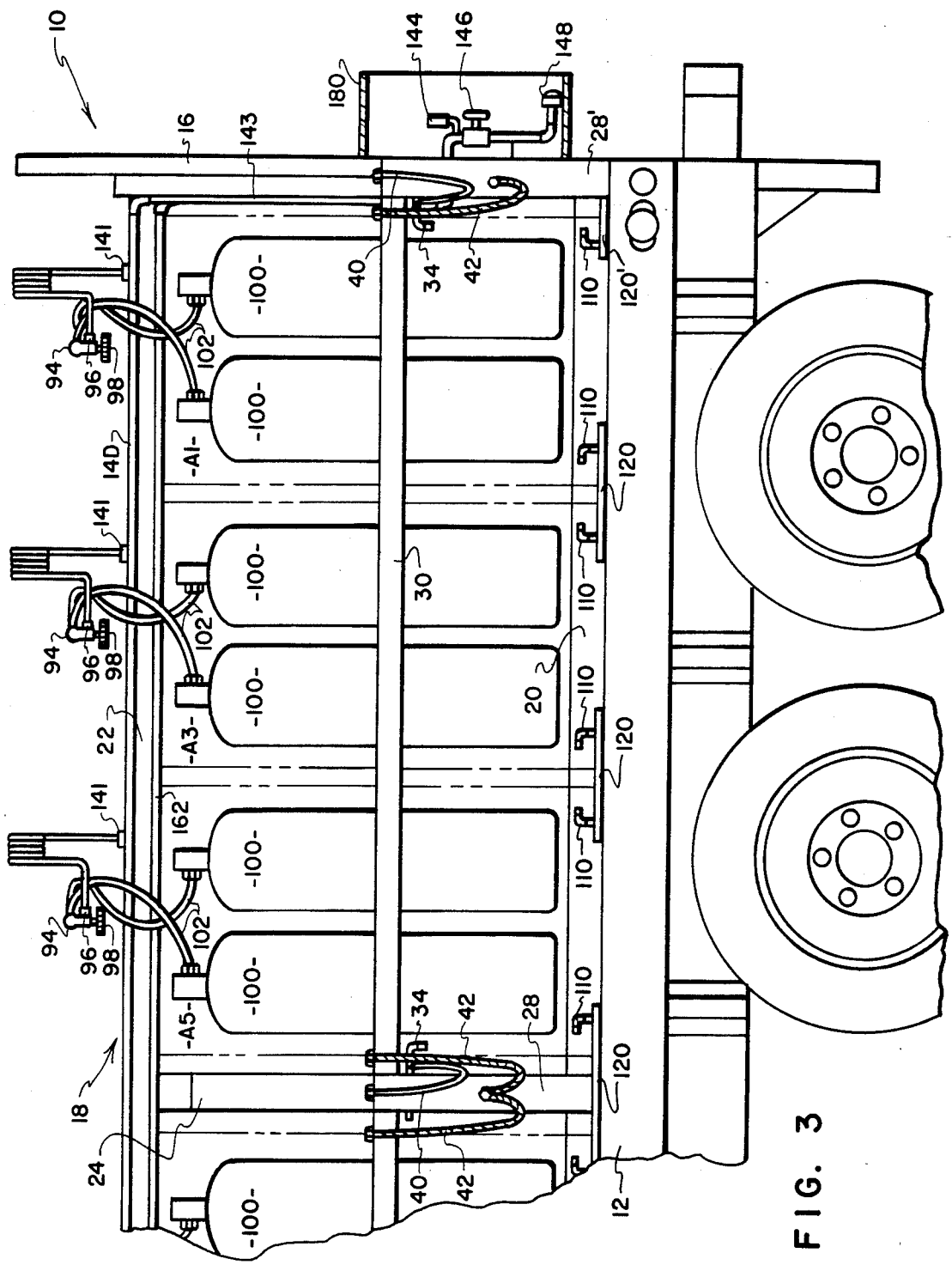
FIG. 3 is a fragmentary side elevational view of the vehicle portion shown in FIG. 2, this view being subject to the same descriptive qualifications as FIG. 2.

Referring to FIGS. 1 to 3, a trailer which serves as the transport vehicle in the present system is indicated generally by the numeral 10. The trailer 10 includes a structure defining an essentially flat bed 12, a vertical front panel 14, and a vertical rear panel 16. A central divider, indicated generally by the numeral 18, segregates the trailer bed 12 into two side-by-side longitudinally extending regions for receiving rows of cylinder-carrying pallets. The central divider 18 includes a bottom beam 20 which is supported on the bed 12, and a top beam 22, which is supported at a level slightly higher than the tops of such cylinders as may be loaded on to the trailer 10. Both of the beams 20, 22 extend from the front panel 14 to the rear panel 16. The divider 18 includes a number of columns 24, in this case three, which serve to support the top beam 22. One of the columns 24 may be seen in FIG. 3.

At the foot of each of the columns 24 is a transverse beam 26. The beams 26 cooperate with the columns 24 and with short upright gate posts 28 located at the margins of the bed 12 to form transverse dividers which further divide the trailer bed 12 into four pallet-receiving areas designated A, B, C and D. Additional gate posts 28' are also provided at opposite sides of the end panels 14, 16.

Each of the areas A, B, C and D provides 6 bays or pallet sites, each of a size suitable to receive a single pallet, as will presently be described. The pallet sites in area A are designated A1, A2, A3, A4, A5 and A6. The other area pallet sites are analogously designated in FIG. 1.

The trailer 10 provides a number of features for speedily and efficiently connecting pallets with the trailer bed 12 and for readily releasing them when off-loading is required.

Each of the areas A, B, C and D is equipped with two gates, one for each side of the trailer. These gates take the form of horizontal bars 30. The ends of the bars 30 rest in appropriate recesses formed in upper ends of gate posts 28 or 28'. The ends of the bars 30 have a depending pierced tabs (not shown) which are received within the posts 28 or 28' and project downwardly to locations where pins 34 are insertable through holes formed in the gate post 28, 28') to penetrate the pierced tab carried on the bars 30 to lock the bars 30 in position. Lanyards 40 are secured to the pins 34 and to their associated gate posts 28 or 28' to assure that the pins 34 are not lost. The ends of each gate bar 30 are also secured to associated ones of the gate posts 28 or 28' by lanyards 42 so that the gate bars 30, when removed, will be suspended in graspable position for ready replacement when needed. The lengths of the lanyards 42 are such as to allow removed ones of the gate bars 30 to be suspended at levels where they offer no obstruction to pallets being loaded onto or off-loaded from the trailer bed 12.

Figure 6:
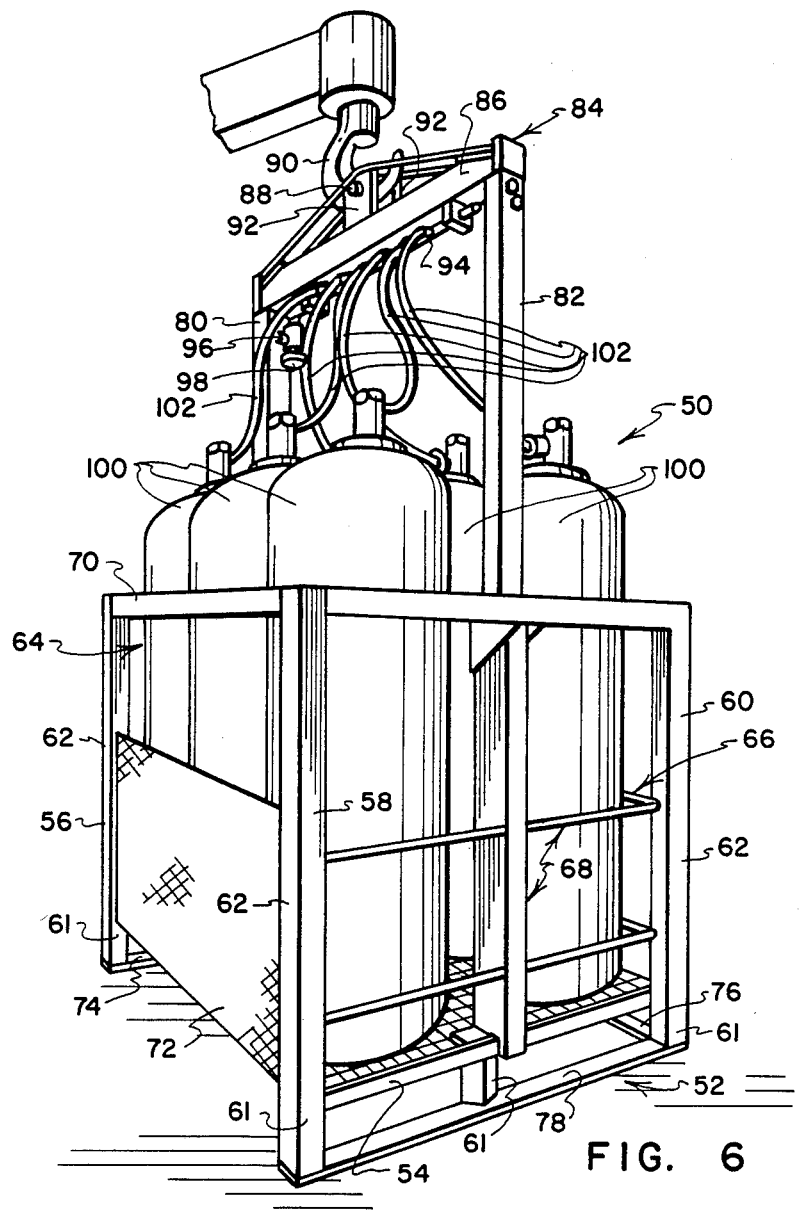
FIG. 6 is a perspective view, on an enlarged scale, of a pallet carrying a plurality of pressurized gas cylinders for use in conjunction with the vehicle of FIGS. 1 to 4; and, FIG. 7 is a perspective view, on an enlarged scale, of one of several toe-like projections carried on a central divider of the trailer for restraining pallets on the trailer bed.

Referring to FIG. 6, one of the pallets which is utilized with the trailer 10 is indicated generally by the numeral 50. The pallet 50 has a floor structure 52 which forms a raised deck 54. Three corner posts 56, 58 and 60, and a fourth post hidden behind cylinders carried on the pallet 50, provide a structural skeleton for the pallet 50. Each of these corner posts includes a short leg portion 61 which supports the deck 54 above the surface upon which the pallet is resting, and a main upward extending portion 62. These upwardly extending post portions 61, 62 define between them three fixed sidewalls 64, 66, and 68. A fourth pallet sidewall is not fixed and consists of a movable gate bar 70 and ramp 72, both of which are openable to allow cylinders to be placed in or removed from the pallet 50. The leg portions 61 are connected at their bottoms by base strips 74, 76 and 78 which are positioned to engage the surface on which the pallet 50 is supported. As thus far described, the pallet 50 is similar to the pallet disclosed in the referenced Pallet Patent.

In addition, the pallet 50 includes two upstanding center posts 80, 82. The post 80 is associated with the sidewall 64 and is positioned at its center. The post 82 is associated with the sidewall 68 and positioned near its center. Both of the posts 80, 82 are securely fastened to the floor structure 52 and to their respective side walls 64, 68, and extend upwardly above the tops of such cylinders as may be carried by the pallet 50.

The center posts 80, 82 and the floor structure 52 form a portion of a lifting frame which is completed by a truss construction or yoke 84. The yoke 84 includes a rigid base or spreader bar 86 which maintains the center posts 80, 82 in properly spaced position and prevents their deflection under load. The yoke 84 also provides at its center a lift contact member in the form of a pin 88 which can be engaged by a crane hook 90 for lifting and handling the pallet 50. Guide plates 92 form a part of the yoke 84 and serve to shroud the hook 90 when the hook 90 is in engagement with the pin 88. By this arrangement, if the crane is of the type provided with dirigible hook, not only the height but also the orientation of the pallet 50 about a vertical axis can be controlled by a crane operator.

A gas delivery manifold 94 depends from and is carried by the yoke 84. The manifold 94 has a plurality of ports, equal in number to the number of cylinders carried by the pallet 50. The manifold 94 carries a connector 96 designed for cooperation with an appropriately configured matching connector on the piping system aboard the trailer 10, which piping system will be presently described. A manually actuable valve 98 controls communication of the manifold 94 with the piping system of the trailer 10.

As shown in FIG. 6, the pallet 50 normally carries a plurality of compressed gas cylinders, in this case six cylinders each designated by the numeral 100. Each cylinder 100 is connected to one of the ports of the manifold 94 by a flexible high pressure hose 102. In view of the repetitive nature of the designations for the cylinders 100 and the hoses 102, only a few are designated in FIG. 2 to avoid congestion of the drawing. The remainder of the cylinders and hoses will be understood as being entitled to the same designations. A pallet embodying certain of the foregoing features forms the subject of the referenced Pallet Case.

Returning now to the description of the trailer 10 and the means for enclosing the pallets 50 as they are loaded onto the trailer bed 12, it will be noted that a plurality of pairs of toe-like projections 110 are welded to both sides of the bottom beam 20 of the central divider 18. The toe members 110 are welded at such a height as to provide between themselves and the trailer bed 12 a clearance of perhaps one inch. These features are best seen in FIGS. 1 and 3 wherein it is apparent that two of the toe members 110 are provided for each pallet site. In FIG. 1 the toe members 110 have been identified with reference characters only in area A, it being understood that corresponding numerals could be provided in areas B, C and D but have been omitted to avoid congestion of the drawing.

Figure 7:
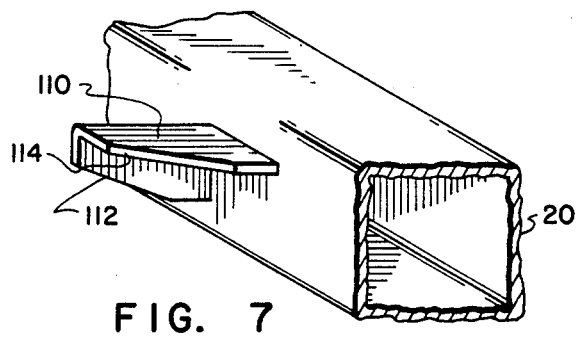

One of the toe members 110 is illustrated in detail in FIG. 7 wherein it can be seen that a first taper 112 is provided at the bottom thereof, and second taper 114 is provided at one side thereof. The toe members 110 at each pallet location are identical one with another, except for being of opposite hand, i.e., the side tapers 114 are oriented in opposite directions. As will be explained, the toe members 110 assist both in positioning pallets 50 as they are loaded onto the trailer 10, and in retaining the pallets 50 in place on the trailer 10.

Additional structure for assuring retention of the pallets 50 on the trailer 10 is illustrated in FIGS. 1 to 3. This structure takes the form of blocking means arranged along the margins of the trailer bed in the form of plates 120, 120' welded to the trailer bed 12 spaced at intervals. The plates 120, 120' are thick enough normally to deter a loaded pallet from sliding in a direction transversely of the bed away from the central divider 18. The plates 120 are carried at locations wherein each serves to engage the adjacent legs 62 of pallets in adjacent pallet cites, such as A1 and A3 for example. The plates 120' are somewhat smaller than the plates 120 and are located at the ends of the trailer 10 to engage the endmost legs of pallets carried in the end pallet sites.

When a pallet 50 is to be placed on the trailer 10, a crane with a hook 90 is positioned to engage the pin 88 of the pallet 50. When such engagement is effected, the pallet 50 is lifted to a level to clear the bed 12 of the trailer. It is then moved transversely of the trailer bed 12 to a position over one of the pallet sites, such as the site A1, but not quite to its home position engaging the central divider 18. The pallet 50 is then lowered slightly to effect engagement between the inner base strip 78 (FIG. 6) and the trailer bed 12. By then nudging the pallet inwardly with regret to the trailer bed 12, the strip 78 is caused to hook under a pair of the toes 110, whereby the strip 78 becomes a horizontal hold down bar trapped beneath the toes 110. As the crane hook 90 is lowered to effect its release, the outer end of the pallet 50 lowers in place behind the blocking members 120 or 120' to bring the pallet 50 to a securely retained home position on the trailer bed 12. The appropriate gate bar 30 is then moved into its retaining position and secured by the pins 32.

To remove the pallet 50 from the trailer bed, assuming that the applicable gate 30 has been removed, the crane hook 90 lifts the pallet 50 slightly to free its outward side from the effect of the blocking members 120 or 120'. The crane is then operated to move the pallet 50 transversely away from the central divider 18 until the hold down bar 78 becomes released from beneath the toes 110. The crane then raises the pallet 50 to a fully clear position, withdraws it from above the trailer bed 12 and deposits it at a desired location.

In connection with above described loading operation it should be noted that positions of the toes 110 are selected with precision with respect to each of the pallet sites. Their positions along the bottom beam 20 are selected such that the toes 110 will lie just inside the pallet leg portions 61 when the pallets 50 are in their home positions. The side tapers 112 of the toe members 110 serve to assist in guiding the pallets 50 into proper location. When the pallets 50 are in their home positions on the trailer 10, the toes 110, serve to assist in preventing any significant fore and aft motion of the pallets 50 in the case of vehicle acceleration or deceleration.

Figure 4:
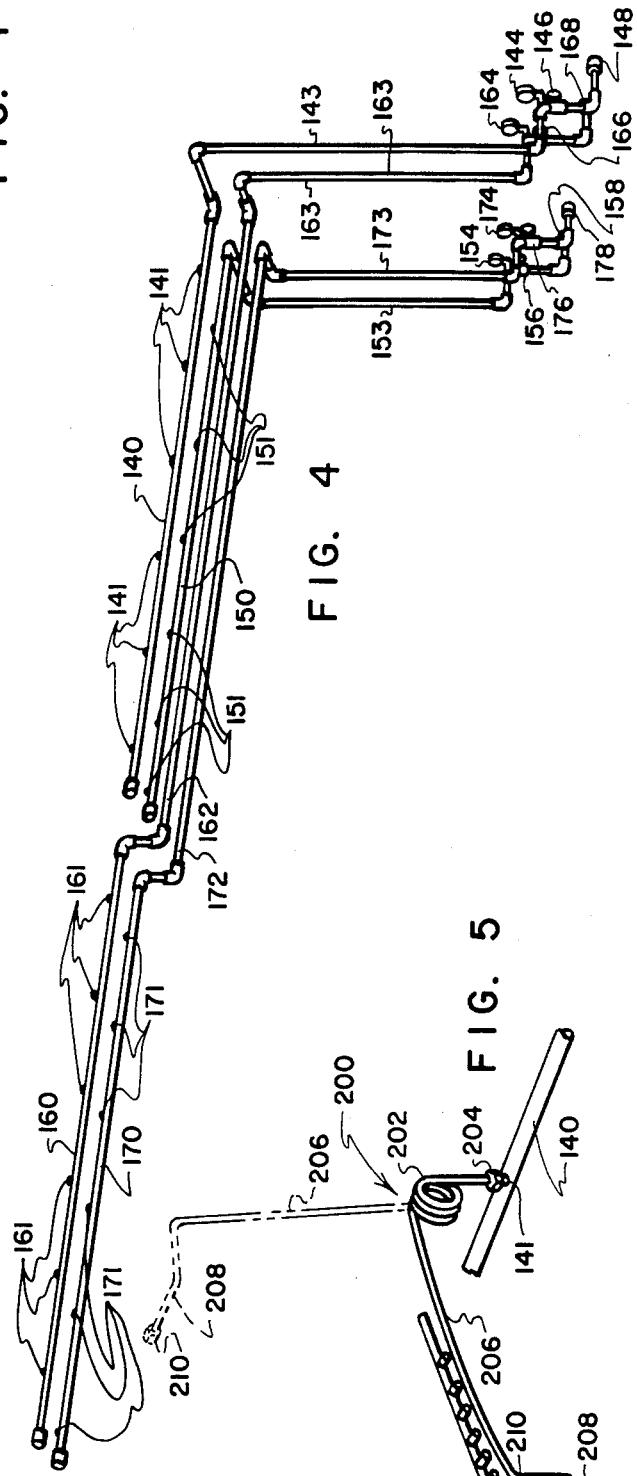
FIG. 4 is a perspective view on a reduced scale, of a portion of a piping system employed on the trailer.
Figure 5:
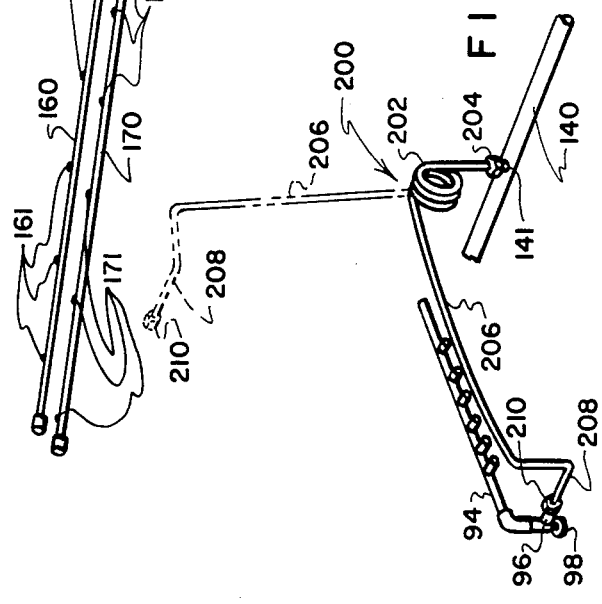
FIG. 5 is a perspective view, on an enlarged scale, of a resilient conduit section used in connecting the trailer piping with pallet-carried manifolds.

Turning now to the piping system for handling the gas during charging and dispensing operations, portions of this system are shown in FIGS. 2 and 3; moreover, FIGS. 4 and 5 are particularly directed to this aspect of the invention. FIG. 4 shows the trailer-carried piping in perspective in a manner disassociated from the trailer structure. The piping system involves, in effect, four elongate manifolds, each serving one quarter of the trailer's capacity. There are two rearward manifolds 140, 150 and two forward manifolds 160, 170.

The rearward manifolds 140, 150 are mounted on the upper surface of the rearward half of the top beam 22 of the central divider 18. The manifold 140 serves all of the pallet sites in the rearward half of the trailer 10 at one side of the central divider 18, i.e., pallet sites A1, A3, A5, B1, B3, and B5, and is provided with six connection fittings 141, one for each such site. The manifold 150 serves the pallet sites A2, A4, A6, B2, B4 and B6 and is similarly provided with six connection fittings 151.

The manifold 140, as it approaches the rear end panel 16, connects to a descending conduit 143 which passes through the panel 16 and connects with a pressure gauge 144, a valve 146 and a service connection 148 carried on the outside of the panel 16 within a protective housing 180. Similarly, the manifold 150 connects with a descending conduit 153 which passes through the panel 16 and connects with a pressure gauge 154, a valve 156 and a service connection 155 within the housing 180.

The two forward manifolds 160 and 170 mounted on the upper surface of the top beam 22 of the central divider 18. The manifold 160 serves of the pallet sites C1, C3, C5, D1, D3, and D5 on one side of the divider 18, and is provided with six connection fittings 161, one for each such site. The manifold 170 serves the pallet sites C2, C4, C6, D2, D4 and D6, and is similarly provided with six connection fittings 171.

As each of the manifolds 160 and 170 reaches the midpoint of the central divider 18 it is rerouted to the under surface of the beam 22 where it joins a horizontal conduit segment 162 or 172. The latter in each case, extends rearwardly to the rear end panel 16 where it connects with a descending conduit 163 or 173 which passes through the panel 16 and thereupon connects with a pressure gauge, valve and service connection assembly 164, 166, 168 or 174, 176, 178 and is carried within the housing 180. The housing 180 and its contents thus constitute a gas distribution control panel.

To connect the trailer piping with the manifolds 94 on the pallets 50, each of the connection fittings 141, 151, 161 and 171 is provided with a special bridging conduit assembly 200, one of which is illustrated in detail in FIG. 5. The bridging conduit assembly 200 includes a length of resilient tubing (e.g. of spring steel) with one end formed into a coil 202 of several turns and provided with a coupling 204 mating with the connection fitting on the appropriate elongate trailer manifold. In FIG. 5, the conduit assembly 200 is shown connected to the fitting 141 on the manifold 140. Such tubing as extends from the other end of the coil 202 is a straight section forming a wand 206 of sufficient length to reach from the central divider to a point near one margin of the trailer 10. The outer tip 208 of the wand is formed so as to extend in a direction lengthwise of the trailer bed, and carries a coupling 210 for mating with the connector 96 on the manifold 94 of a pallet 50.

The construction of the assembly 200 is such that, when the coupling 204 is attached to its connection fitting 141 and the coupling 210 is unattached, the wand 206 will pivot automatically to the vertical position as shown in broken lines in FIG. 5. The assembly 200 is put into operative condition by grasping the wand 206 and moving it in opposition to the resilience of the coiled portion 202 to the lowered position shown in solid lines in FIG. 5. When the wand 206 is in its lowered position it extends across the top of an associated pallet 50 and permits connection of the coupling 210 with the connector 96. This arrangement enables the valve 98, which is the control permitting the flow of gas from or to the cylinders of each of the pallets 50, to be located along the perimeter of the trailer 10 where it is readily accessible for manipulation by persons controlling the system, without requiring that the trailer piping also be located at the perimeter in a position to cause interference with loading or off-loading of pallets 50. Moreover the character of the bridging conduit assembly 200 is such that the wand 206 is automatically retracted by the resilience of the coiled portion 202 as soon as the coupling 210 is released from the connector 96.

Such elements of the gas distribution piping as are carried in the housing 180 form a control panel by which the gas flow can be controlled. Each of the valves 146, 156, 166 and 176 controls the flow of gas from one fourth of the capacity of the trailer (assuming that all of the valves 98 are open). It is therefore possible to draw gas from whatever quarter of the trailer capacity is most suitable at the time by connecting to the appropriate service connections 148, 158, 168 or 178 or combinations thereof. In special instances where the customer conditions demand a transfer of a large volume of gas at relatively constant pressure, it is possible to apply a manifold (not shown) to all four service connections and thereby deliver gas under the required conditions by using the total trailer capacity simultaneously.

The operation of the system of the present invention can best be described in terms of an exemplary delivery cycle. Assuming that all cylinders have been charged to capacity at the base station, the trailer 10 is moved to a customer location at which time a determination is made as to what type of delivery is required in terms of volume, speed and pressure. After the appropriate connection is made to one or more of the service connections 148, 158, 168, 178, the delivery is made by operating the appropriate ones of the valves 146, 156, 166, 176.

The process of delivery may take place over a period of days or even weeks, during which time the trailer 10 is left in place at the customer facility. When delivery is complete, the valves 146, 156, 166, 176 are closed and the customer's equipment is detached from the service connections 148, 158, 168, 178, and the trailer 10 is replaced at the customer's location by an identical but refilled trailer, while the depleted trailer is returned to the base station for refilling.

In the case of acetylene gas, regulations normally require that a certain percentage of the cylinders 100 be removed from the trailer 10 and individually checked and filled to assure that the contents of these cylinders is adequate and proper. Accordingly, when the trailer 10 reaches the base station, a determination is made by appropriate company authority as to the cylinders on which of the pallets are due for individual checking and refilling. The pallets containing cylinders to be individually refilled are removed from the trailer 10. Based on such data as is learned during the checking of the removed cylinders, such cylinders as remain on the trailer are gang refilled utilizing the trailer's piping systems.

In accordance with a feature of the present invention, all of the pallets 50 carried on the trailer 10 are equally and immediately accessible. Pallets 50 containing cylinders to be individually checked and filled are removed from the trailer 10 by first releasing the associated gate bars 30 from their retaining positions. A crane approaches the side of the trailer 10 and its hook 90 is maneuvered into engagement with the pins 88 of the pallets 50 containing cylinders to be checked. At the same time an operative closes the valves 98 of these pallets and releases the couplings 210 on the associated wands 206, whereupon the disconnected wands move to their retracted positions. Using the technique previously described, the disconnected pallets are removed from the trailer 10 and their cylinders are checked.

After weighing is completed, the checked cylinders are refilled individually and returned to their pallets. The pallets 50 are then returned to their sites by the crane using the earlier described procedure, the associated wands 206 are reconnected, and the associated valves 98 are re-opened. The trailer 10 is then ready for another customer service run.

It should be noted that the procedure for off-loading and loading of pallets is efficient and speedy regardless of whether it is required for cylinder checking and refilling, or for other reasons such as maintenance to the vehicle or pallets. It is also pointed out that, in addition to the individual accessibility of the pallets on the trailer, the trailer sites and their appurtenances are all uniform, as are all of the pallet constructions. This provides for total interchangeability, permitting any pallet to be carried in any pallet site.

While handling of the pallets 50 has been described as utilizing a crane, it will be understood that the required manipulations of the pallets 50 can be effected utilizing a conventional fork lift truck. A feature of the invention lies in the provision of trailer-carried restraints and connections for pallets which are so configured that either an overhead crane or a fork lift truck may be utilized to load and off-load pallets.

Although the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A system for handling and delivering gas stored in pressurized cylinders carried in pallets, comprising:
    (a) a flat bed vehicle having a central fore-and-aft divider and a single row of pallet sites along each side of the divider, each pallet site extending from the divider substantially to the margin of the vehicle;
    (b) a plurality of substantially uniform pallets each shaped to carry a predetermined number of cylinders and to fit into a pallet site, each pallet including first formation means located along the side of the pallet which approaches the divider when the pallet is placed into a pallet site on the vehicle;
    (c) second formation means located along the divider for engaging the first formation means as a pallet is moved horizontally into a pallet site to assist in holding the pallet in place on the vehicle; and,
    (d) blocking means for normally preventing horizontal movement of a pallet away from the divider when a pallet is in position at a pallet site.

2. The system of claim 1 wherein the blocking means comprises a plurality of upstanding posts on the margin of the vehicle bed, gate bars extending between the posts and interlocking with them to prevent movement away from the divider of pallets carried in the pallet sites, retainer pins for holding the gate bars in interlocking relationship with the posts, and support lanyards for supporting said gate bars in ready position clear of the path of a pallet during its movement into or out of a pallet site.

3. The system of claim 1 wherein the blocking means includes stop plates secured to the margin of the vehicle bed just outboard of the pallet sites.

4. The system of claim 1 wherein the first and second formation means are engageable as a pallet is moved into place on the vehicle to guide the pallet into proper pallet site position in a direction fore-and-aft of the vehicle.

5. The system of claim 1 wherein the first formation means includes a horizontal hold-down bar carried on each pallet, and the second formation means includes a plurality of projecting formations carried on the divider and arranged to overlie the horizontal hold-down bars of the pallets to prevent pallet tilting relative to the vehicle bed.

6. A system for handling and delivering pressurized gas stored in erect cylinders carried in pallets, comprising:
    (a) a flat bed vehicle having a central fore-and-aft divider and a single row of pallet sites along each side of the divider, each pallet site extending from the divider substantially to the margin of the vehicle;
    (b) a plurality of substantially uniform pallets each configured to carry a predetermined number of erect cylinders and to fit into a pallet site, each pallet including first formation means located along a side of the pallet which approaches the divider when the pallet is placed into a pallet site on the vehicle;
    (c) a manifold on each pallet connected with all of the cylinders carried by the pallet;
    (d) second formation means located along the divider for engaging the first formation means as a pallet is moved horizontally into a pallet site to assist in holding the pallet on the vehicle;
    (e) blocking means for normally preventing horizontal movement of a pallet away from the divider when in position in a pallet site;
    (f) a gas distribution control panel carried by the vehicle; and,
    (g) piping means on the vehicle connecting each of the pallet manifolds with the gas distribution panel.

7. The system of claim 6 wherein the second formation means includes two toe-like projecting members for each pallet site so located as to coact with vertical surfaces on the pallet and guide the pallet into correct fore-and-aft position as the pallet is moved into a pallet site.

8. The system of claim 6 wherein the blocking means comprises a plurality of upstanding posts on the margin of the vehicle bed, gate bars extending between the posts and interlocking with them to prevent movement away from the divider of pallets in the pallet sites, retainer pins for holding the gate bars in interlocking relationship with the posts and support lanyards for supporting said gate bars in ready position clear of the path of a pallet during its movement into or out of a pallet site.

9. The system of claim 8 wherein said blocking means further includes stop plates secured to the margin of the vehicle bed just outboard of the pallet sites.

10. The system of claim 6 wherein the first formation means includes a horizontal hold-down bar carried on each pallet, and the second formation means includes a plurality of projecting formations carried on the divider and arranged to overlie the horizontal hold-down bars of the pallets to prevent pallet tilting relative to the vehicle bed.

11. A system for handling and delivering gas stored in pressurized cylinders carried in pallets which comprises:
    (a) a flat bed vehicle having a central fore-and-aft divider and a single row of pallet sites along each side of the divider;
    (b) a plurality of uniform pallets each shaped to carry a predetermined number of cylinders and to fit into a pallet site and normally located therein;
    (c) a pallet manifold on each pallet connected with the cylinders on the pallet and having a control valve and connection fitting both at a readily accessible location adjacent the margin of the vehicle when the pallet is in place in the pallet site;

(d) piping mounted on the vehicle, extending lengthwise thereof along the divider and terminating at a control panel at a readily accessible location at one end of the vehicle; and, (e) means forming a bridging conduit between the piping and the pallet manifold and including means at that end of the bridging conduit associated with the manifold for readily connecting the same to and disconnecting it from the connection fitting on the pallet manifold.

12. The system of claim 11 which further includes means, active whenever the bridging conduit is disconnected from the pallet manifold, for retracting the bridging conduit to a position that is clear of the path of movement of a pallet being loaded or off-loaded.

13. The system of claim 12 wherein the means for retracting the bridging conduit is a resilient coil portion of the conduit itself.

14. A system for handling and delivering gas stored in pressurized cylinders carried in pallets which comprises:

(a) flat bed vehicle having a central fore-and-aft divider and a single row of pallet sites along each side of the divider, each pallet site extending from the divider substantially to the margin of the vehicle;

(b) a plurality of substantially uniform pallets each shaped to carry a predetermined number of cylinders and to fit into a pallet site, each pallet including a horizontal hold down bar at the side which approaches the divider when the pallet is placed into a pallet site on the vehicle;

(c) toe means projecting from the divider at a level to overlie and hold down relationship with the hold down bar as a pallet is moved horizontally into a pallet site;

(d) blocking means for preventing horizontal movement of a pallet away from the divider when in position on a pallet site;

(e) a pallet manifold on each pallet connected with the cylinders on the pallet and having a control valve and connection fitting both at a readily accessible location adjacent the margin of the vehicle when the pallet is in place in the pallet site;

(f) piping mounted on the vehicle, extending lengthwise thereof along the divider and terminating at a control panel at a readily accessible location at one end of the vehicle; and, (g) means forming a bridging conduit between the piping and the pallet manifold and including means at an end of the bridging conduit associated with the manifold for readily connecting the same to or disconnecting it from the connection fitting on the pallet manifold.

15. The system of claim 14 wherein the blocking means comprises a plurality of upstanding posts on the margin of the vehicle bed, gate bars extending between the posts and interlocking with them to prevent movement away from the divider of pallets in the pallet sites, retainer pins for holding the gate bars in interlocking relationship with the posts and support lanyards for supporting said gate bars in ready position clear of the path of a pallet during its movement into or out of a pallet site.

16. The system of claim 15 wherein the blocking means includes stop plates secured to the margin of the vehicle bed just outboard of the pallet sites.

17. The system of claim 16 additionally including means associated with the divider for guiding an incoming pallet into proper pallet site position in a direction fore-and-aft of the vehicle in response to its motion transversely of the vehicle while being loaded.

18. The system of claim 17 additionally including means, active whenever the bridging conduit is disconnected from the pallet manifold, for retracting the bridging conduit to a position such that is clear of the path of movement of a pallet being loaded or off-loaded.

19. The system of claim 18 wherein the means for retracting the bridging conduit is a resilient coil portion of the conduit itself.

20. The system of claim 19 wherein each of the pallets includes means providing a single point overhead suspension system engageable by a crane hook for handling the pallets while positioning them in the pallet sites on the vehicle bed, and off-loading them therefrom.

21. A method of providing pressurized gas to a customer location, comprising the steps of:

(a) providing a flat bed vehicle with a central divider defining two side-by-side pallet sites, a plurality of pallets sized to be positioned in the pallet sites, each pallet carrying a plurality of pressurized gas cylinders and having a pallet manifold connected to its cylinders, the pallets and the vehicle having inter-engaging formation means for retaining the pallets in place on the vehicle adjacent the central divider, piping means on the vehicle associated with the central divider and leading to a control panel with valves and service connections, and a bridging conduit means, one for each pallet site, connected at intervals to the piping means;

(b) charging the cylinders with pressurized gas;

(c) assembling the cylinders in the pallets and loading the pallets into the pallet sites, and connecting the pallet manifolds to the vehicle piping means;

(d) operating the vehicle to transport the pallet-carried cylinders to a customer location;

(e) connecting the service connections to customer-receiving connections; and, (f) dispensing the pressurized gas from the cylinders through the vehicle piping means and the control panel to the customer-receiving connections.

22. The method of claim 21 wherein the step of charging the cylinders is effected, at least in part, while at least selected ones of the cylinders are in place on the vehicle and utilizing the vehicle piping system to supply pressurized gas to at least some of the selected cylinders.

23. In association with a system comprising a flat bed vehicle with a central divider separating two series of pallet sites, pluralities of cylinders for holding pressurized gas mounted in pallets and connected to pallet manifolds each mounted on one of the pallets and having a control valve and a connector, the pallets each including a hold down bar, projection means on the vehicle adjacent the central divider, blocking means at the margins of the vehicle bed including movable gate means and fixed stop blocks, piping means on the vehicle associated with the central divider and leading to a control panel with valves and service connections, and bridging conduit means, one for each pallet site, connected at intervals to the piping means, the method comprising:

(a) assembling the cylinders in the pallets and loading the pallets into the pallet sites with the pallet manifold connector and valve adjacent the vehicle bed margin;

(b) connecting the cylinders on each pallet to the corresponding pallet manifold;
(c) connecting an end of the bridging conduit to the manifold connector;
(d) disconnecting the service connections from the source;
(e) moving the vehicle to a gas user location;
(f) connecting the service connections to user input connections and dispensing pressurized gas to the user input connections;
(g) disconnecting the service connections;
(h) returning the vehicle to a service location for checking;
(i) removing a movable gate;
(j) closing the manifold valve on a selected pallet;
(k) disconnecting the associated bridging conduit from the manifold connector of at least a selected one of the pallets;
(l) raising the selected pallet slightly to clear the stop blocks;
(m) withdrawing the selected pallet laterally from the vehicle to release its hold down bar from the projection means;
(n) raising the selected pallet and moving it to a checking point and conducting the check on the cylinders carried by the selected pallet;
(o) moving the selected pallet laterally of the vehicle bed above its pallet site;
(p) lowering the selected pallet sufficiently to position its hold down bar at a level lower than the projection means;
(q) lowering an outboard portion of the selected pallet behind the stop blocks;
(r) replacing the movable gate means,
(s) connecting the bridging conduit means with the manifold connector of the selected pallet; and,
(t) opening the manifold valve of the selected pallet.

24. The method of claim 23 additionally including the step of refilling the cylinders of the selected pallet while such cylinders are removed from the vehicle.

25. The method of claim 23 additionally including the step of refilling at least some of the cylinders while they are in place on the vehicle by connecting the service connections of the vehicle to a source of pressurized gas.

* * * * *